United States Patent [19]

Fukatani

[11] 4,141,441
[45] Feb. 27, 1979

[54] RELEASE ASSISTOR OF A FRICTION CLUTCH
[75] Inventor: Yasunobu Fukatani, Hirakata, Japan
[73] Assignee: Kabushiki Kaisha Daikin Seisakusho, Osaka, Japan
[21] Appl. No.: 803,239
[22] Filed: Jun. 3, 1977
[30] Foreign Application Priority Data
Aug. 17, 1976 [JP] Japan ................................ 51-98411
[51] Int. Cl.² ........................................... F16D 13/75
[52] U.S. Cl. .............................. 192/70.25; 192/70.28; 192/111 A
[58] Field of Search ............. 192/70.25, 70.28, 111 A; 188/71.8, 196 R

[56] References Cited
U.S. PATENT DOCUMENTS

| 3,221,854 | 12/1965 | Jaeschke et al. | 192/111 A X |
| 3,478,853 | 11/1969 | Kraeplin | 192/111 A |
| 3,702,651 | 11/1972 | Fujita et al. | 192/70.28 X |
| 3,762,522 | 10/1973 | Kirschling | 192/111 A |
| 3,773,155 | 11/1973 | Fujita et al. | 192/70.28 X |
| 3,822,772 | 7/1974 | Murakami | 192/70.28 X |
| 3,933,230 | 1/1976 | Adachi | 192/70.28 |

FOREIGN PATENT DOCUMENTS 1379091 1/1975 United Kingdom ................. 192/111 A Primary Examiner—Allan D. Herrmann
Attorney, Agent, or Firm—Burns, Doane, Swecker & Mathis

[57] ABSTRACT

This invention relates to a release assistor which completely separates a facing surface on a clutch disc periphery from a driving fly-wheel by a prescribed distance when releasing a friction clutch. According to this invention, a sufficient retraction force and a required retraction stroke can be obtained within a narrow space in a clutch, and thus an improved durability of the release assistor is provided.

5 Claims, 9 Drawing Figures

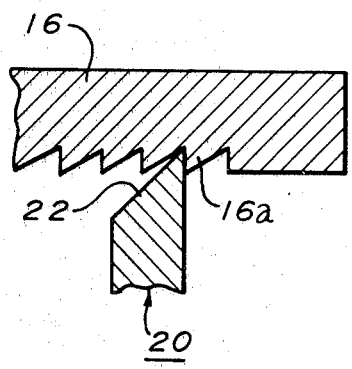
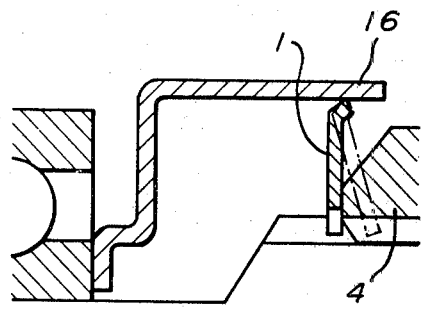
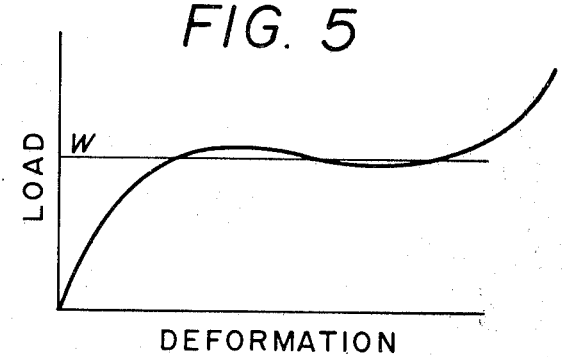
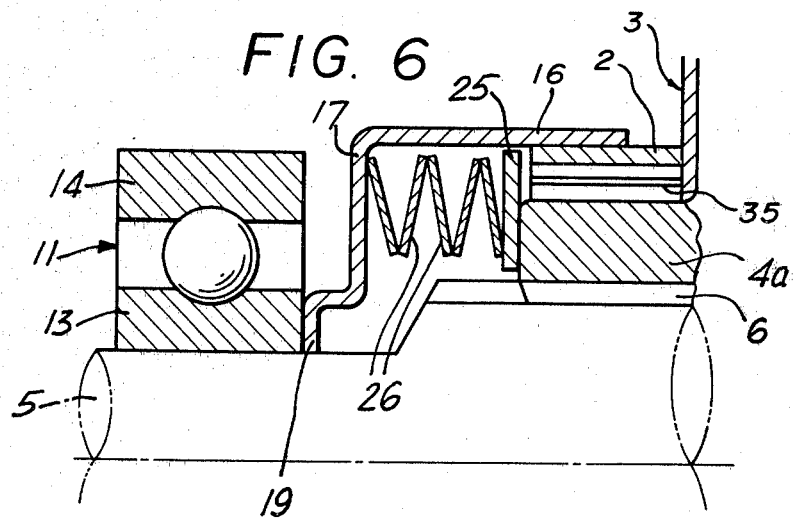

RELEASE ASSISTOR OF A FRICTION CLUTCH

This invention relates to a release assistor which completely retracts the facing surface on a clutch disc periphery from a fly-wheel of an engine by a prescribed distance when releasing a friction clutch for use in an automobile etc.

In general an automobile clutch is provided with an engine, fly-wheel, a main driving shaft supported in a center bore of the fly-wheel through a pilot bearing, a clutch disc slidably fitted on the main driving shaft with a spline, and a pressure plate which presses the frictional facing surface on the clutch disc periphery against the fly-wheel. When the clutch pedal is operated, the pressure plate is pulled away from the clutch disc against the force of the clutch spring, the facing surface on the clutch disc periphery is disengaged from the fly-wheel, and the torque which had been transmitted from the fly-wheel through the clutch disc to the main driving shaft is cut off between the fly-wheel and the clutch disc. However, friction exists between the spline hub at the clutch disc and the spline on the main driving shaft so that, by only retracting the pressure plate from the clutch disc, the clutch disc might not completely disengage the fly-wheel, but might remain in contact therewith, so that the main driving shaft could be subjected to a drag torque from the fly-wheel, which might interfere with a successive gear changing operation.

In a conventionally proposed device for retracting the clutch disc from the fly-wheel by a prescribed distance when releasing the clutch, one pawl spring carries out three functions: (1) to position the pawl within a casing, (2) to furnish the clutch disc with a required retracting force when releasing clutch, and (3) to establish a prescribed retracting stroke.

However, since a release assistor must be installed in a narrow space in the clutch, it has hitherto been impossible to furnish the comparatively small sized pawl spring with the above-mentioned three functions. That is sufficient retraction force and stroke.

The invention is a release assistor for a friction clutch comprising a fly-wheel, a main driving shaft centrally supported in a fly-wheel pilot bearing, a clutch disc loosely fitted on the main driving shaft by means of a spline, and a pressure plate which presses a frictional facing surface on the clutch disc against the fly-wheel; a cylindrical release assistor casing, which has an annular inward flange at an end thereof, being arranged on the main driving shaft such that the said inward flange contacts a supporting means associated with the main driving shaft, a casing cylindrical part covering a part of a spline hub of the clutch disc, a pawl member adjustable only in the direction of the pilot bearing engaging an inner surface of the casing cylindrical part, and a spring compressed between an end face of the spline hub and a casing abutment, the said pawl member facing the clutch disc and being spaced from the hub end face in order to provide a clearance corresponding to a retracting stroke of the clutch disc between the said spring and the pawl member when the clutch is engaged and the frictional facing surface on the clutch disc is pressed against the fly-wheel.

An advantage of the present invention is that the retraction force and stroke against the clutch disc in releasing the clutch are subject to little influence, even when a meshing point of the pawl member in the release assistor against the casing shifts by an amount corresponding to an axial movement of the clutch disc during engagement of the clutch, due to the vibration of the engine or the vehicle.

When applying a plurality of belleville or diaphragm springs in the release assistor in order to provide the retraction force against the clutch disc, it might be impossible to provide a sufficient return force because of a bending back or buckling of a part of the belleville springs when the clutch is engaged due to a defective or weaker spring. The present invention reduces the possibility of this malfunction.

For the purpose of illustration, but not of limitation, the embodiments of the invention are hereinafter described with reference to the following drawings, in which:

FIG. 4a is a partially enlarged view of FIG. 4;

FIG. 5 is a load-deformation characteristic diagram of a group of the belleville springs of FIG. 1;

FIG. 6 is an alternative view corresponding to FIG. 4;

FIG. 7 is a partially enlarged view of a conventional release assistor according to the invention.

Figure 1:
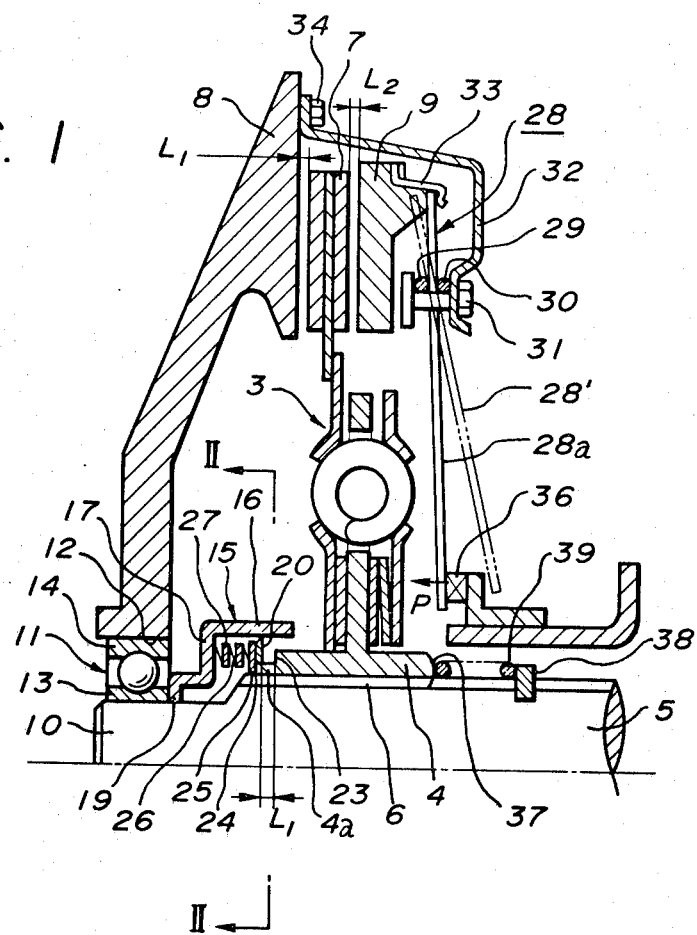
FIG. 1 is an upper half verticle sectional view showing the friction clutch in the released condition.

In FIG. 1 a spline hub 4 at the center of a clutch disc 3 loosely fits in a spline 6 of a main driving shaft 5. A peripheral facing surface 7 is located between a fly-wheel 8 and a pressure plate 9 spaced therefrom by almost equal distances $L_1$ and $L_2$ respectively. Thus the facing surface 7 is separated from both the fly-wheel 8 and the pressure plate 9. A reduced diameter portion 10 of the shaft 5 is carried by a bore 12 of the fly-wheel 8 through a pilot bearing 11. The reduced diameter portion 10 is tightly fitted in an inner race 13 of the pilot bearing 11, an outer race 14 thereof being tightly fitted in the bore 12.

Figure 2:
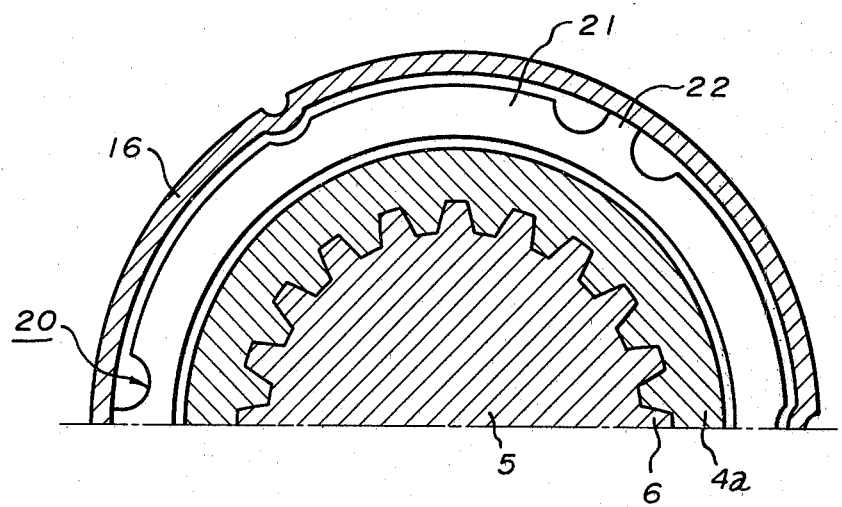
FIG. 2 is an enlarged sectional view taken substantially on the line II—II of FIG. 1.

A cylindrical release assistor casing 15 of integral construction is made, for example, of press-formed steel plate, and comprises a cylindrical part 16, an annularly stepped part 17 forming a bottom, and an inward flange 19. The inward flange 19 contacts the right side face of the inner race 13 on the shaft portion 10. A claw 22 (FIGS. 2 and 4a) of a pawl 20 engages a ratchet tooth 16a provided on an inner surface of the cylindrical part 16. Thus the pawl 20 is able to move only in the direction to the left. The pawl 20 punch formed from a moderately thick steel plate, provides a plurality of claws 22 on an outer periphery of an annular body 21. For example, as shown in FIG. 2, the body 21 faces an annular shouldered part 23 (FIGS. 1 and 3) of the spline hub 4 at a distance $L_1$ therefrom. The spline hub 4 has an integral reduced diameter portion 4a on an extension of the annular shouldered part 23. A washer 25 contacts the end face 24 of the portion 4a, and several belleville springs 26 and shims 27 placed between adjacent springs are arranged alternately between the washer 25 and the casing shouldered part 17. In the clutch released position when the clutch facing surface 7 is retracted from the fly-wheel by the distance $L_1$ (FIGS. 1 and 3), the spring force of the belleville springs 26 acts on the pawl 20 through the washer 25.

Figure 3:
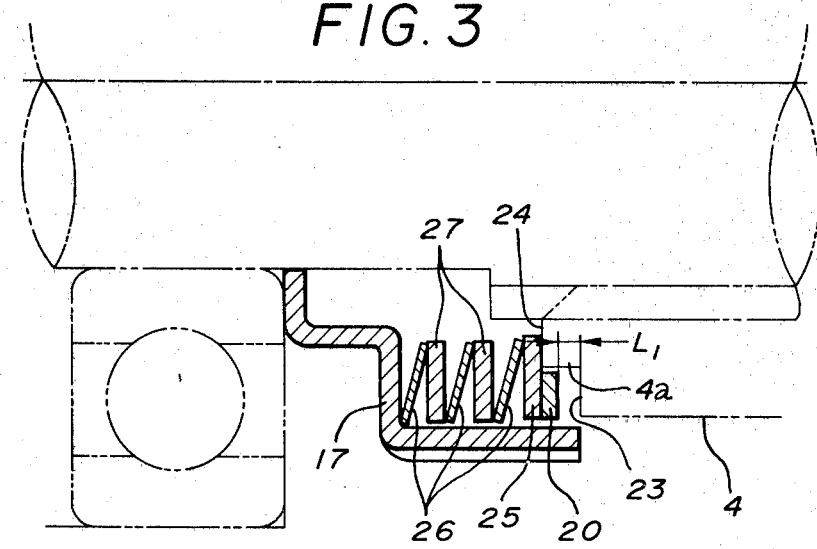

Since the belleville springs 26, (for example three such springs are shown in FIG. 3) arranged in parallel by interposing shims 27, the shims being approximately the same thickness as the washer 25 the load-deformation characteristic has a longer horizontal portion as shown in FIG. 5. As a result, an approximately constant spring force W is obtainable over a wide deformation range. Further, in the releasing of the clutch, by suitable selection of the belleville springs 26, the force W is sufficient to retract the clutch disc in the direction to the right.

In FIG. 1, 28 is a diaphragm clutch spring, 29 and 30 are wire rings which provides a supporting point for the spring 28, and 31 is a stud pin. The stud pin 31 is fixed to a clutch cover 32 to support the wire rings 29 and 30. An outer periphery of the clutch spring 28 is held to the pressure plate 9 by a plurality of clips 33. The pressure plate 9 is connected to the clutch cover 32 by a plurality of straps (not shown) extending in the radial direction. Thus they are subjected to a driving force from the clutch cover 32. The clutch cover 32 is fixed to the fly-wheel 8 by a plurality of bolts 34. A release bearing 36 faces against inner ends of inwardly radial tongue-shaped pieces 28a. In the clutch released position as shown in FIG. 1, a releasing load P is applied from the release bearing 36 on the inner ends of the tongue-shaped pieces 28a by operating a clutch pedal not shown in the figure. The springs bend back as shown therein, thus the pressure plate 9 being pulled back from the facing surface 7 by the distance $L_2$. In order to separate the facing surface 7 and hold it between the fly-wheel 8 and pressure plate 9 in clutch released condition, a compression coil spring 39, which is weaker than the belleville springs 26, and a snap ring 38 are provided on the spline 6 and the supporting part of the main driving shaft.

The fly-wheel 8 and pressure plate 9 are driven by the engine in the clutch released condition shown in FIG. 1. However, the main driving shaft 5 is not thereby driven because the facing surface 7 is separated from both. In this position the group of the belleville springs 26 so extends as to contact the left side face (FIG. 3) of the pawl 20 through the washer 25 and pushes the spline hub 4 rightward to push the facing surface 7 back from the fly-wheel 8 a distance $L_1$. The facing surface 7 stops and maintains that position by the action of the coil spring 39, meanwhile the pressure plate 9 retracts in the rightward direction by means of a warping of the diaphragm spring 28, but the force of the belleville springs 26 does not act on the spline hub 4 after the washer 25 makes contact with the pawl 20. Further, the pressure plate 9 is retracted from the facing surface 7 by the distance $L_2$ by means of the force of the coil spring 39. Thus, the possibility of the facing surface 7 being subjected to the drag torque from the fly-wheel 8 and the pressure plate 9 can be eliminated.

Figure 4:
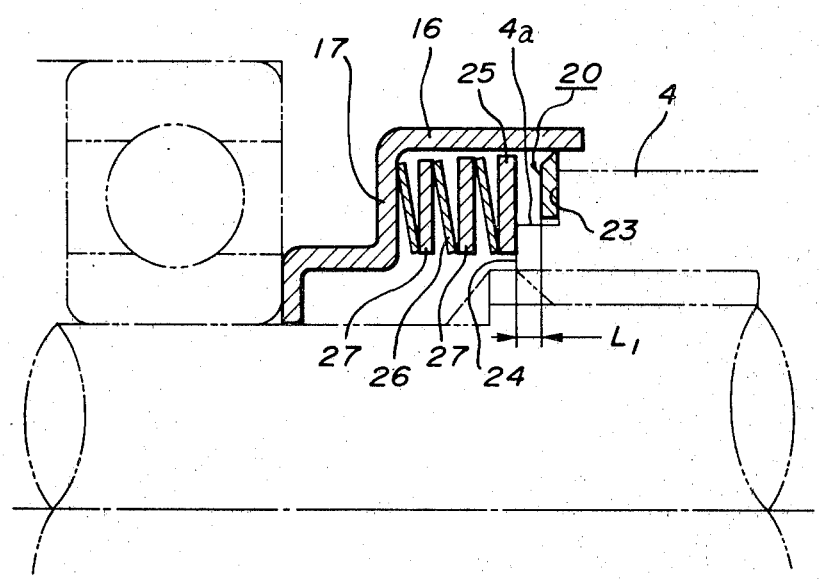
FIGS. 3 and 4 are partially enlarged views showing released and engaged conditions of the clutch of FIG. 1 respectively.

When the clutch pedal (to remove the releasing force P which had been applied on the diaphragm spring 28 from the release bearing 36) has been released, the diaphragm spring returns to the position as illustrated by 28' and pushes the pressure plate 9 to the left. Thus the facing surface 7 makes contact with and is sandwiched between the fly-wheel 8 and pressure plate 9. In this manner the engine power is transmitted from the fly-wheel 8 through the clutch disc 3 to the main driving shaft 5. In the above-mentioned clutch engaging stroke, the spline hub 4 moves to the left against the spring force of the belleville springs 26 from the position shown in FIG. 3 to that in FIG. 4. It moves through the distance $L_1$ until the shouldered part 23 contacts with the right side face of the pawl 20 and the clutch facing surface 7 becomes pushed against the fly-wheel 8 to provide complete engagement of the clutch. At that time the distance $L_1$ is opened between the pawl 20 and the washer 25 as shown in FIG. 4. In the above-mentioned clutch engaged condition, energy for the next clutch releasing action is accumulated in the belleville springs 26.

In order to successively cut off the torque, the release force P will first release the facing surface 7 from the pressure plate 9, so that the spline hub 4 slides from the position shown in FIG. 4 to the right by the action of the force of the belleville springs 26. The washer 25 moves to the right a distance $L_1$ to contact the left side face of the pawl 20; when it moves through $L_1$ the facing surface 7 is pushed back from the fly-wheel 8 by the distance $L_1$. Thus the clutch is completely released. Since, in the engaged position of the clutch the position of the clutch disc 3 slowly shifts to the left as the facing surface 7 wears, the pawl 20 is also pushed along by the spline hub 4 so that its engaged position moves to the left.

The applicant of this invention has been developing various release assistors in which the pawl spring has three functions: (1) to hold the position of the pawl itself by making the claws at the periphery mesh with the inner surface of the casing cylindrical part 16, (see FIG. 7), (2) to furnish the spline hub 4 with the retracting force towards the right when the clutch is released, and (3) to furnish the release assistors with a required retraction stroke. However, it has been difficult to provide a small sized pawl proper capable of satisfying the above-mentioned three functions because the release assistor must be installed within a narrow restricted space. Consequently, sufficient retraction force and stroke has been difficult to achieve. This is especially true in the clutch engaged condition as shown in FIG. 7, where the pawl 1 meshes with the inner surface of the cylindrical part 16 at a condition immediately prior to the act of sliding toward left side, so that the tip end of the claw shifts toward left through a distance, for example 0.4 mm, corresponding to the maximum amplitude when the spline hub 4 is subjected to a high frequency vibration in the axial direction as a result of engine vibration etc. Therefore not only is the retraction stroke of the successive releasing clutch decreased by 0.4 mm but the stroke of 0.4 mm is subtracted or eliminated from the maximum deformation of the pawl 1, so that there has been the disadvantage that the retraction force is inevitably decreased.

According to this invention, however, the pawl 20 needs only to carry out the function of meshing with the inner surface of the casing cylindrical part 16. The retraction force and required stroke are furnished by the belleville springs 26. Therefore, the present invention offers the advantage that the function as a release assistor is stabilized for a long period. That is, the pawl 20 meshes with the inner surface of the casing cylindrical part 16 at the condition immediately prior to the act of sliding towards the left side when engaging the clutch as illustrated in FIG. 4. Even in the case where, at this moment, the pawl 20 shifts to the left by about 0.4 mm due to high frequency vibration axially applied from the spline hub 4, the pawl 20 only becomes separated and free from the shouldered part 23 to exert no influence upon the initial return force of the belleville springs 26.

Although a decrease in the return stroke (0.4 mm) due to the leftward shift of the pawl 20 by 0.4 mm is unavoidable, making the equivalent allowance in the stroke of the belleville spring in advance will provide the spline hub 4 with a sufficient retraction stroke to eliminate the possibility of a faulty cut-off of the clutch. As the facing surface 7 becomes worn, the position of the clutch disc 3 at the clutch engaged position shifts towards the left, and the pawl 20 is pushed by the shouldered part 23 to shift the meshing position with the casing cylindrical portion 16 towards the left. However, since the relative position of the shouldered part 23 and the belleville springs 26 is unchanged, the facing surface 7 can always be returned a distance $L_1$ regardless of the wear thereof. The retraction force becomes approximately constant to provide a stable clutch cut-off characteristic by adopting a group of belleville springs having the spring characteristic shown in FIG. 5.

Figure 8:
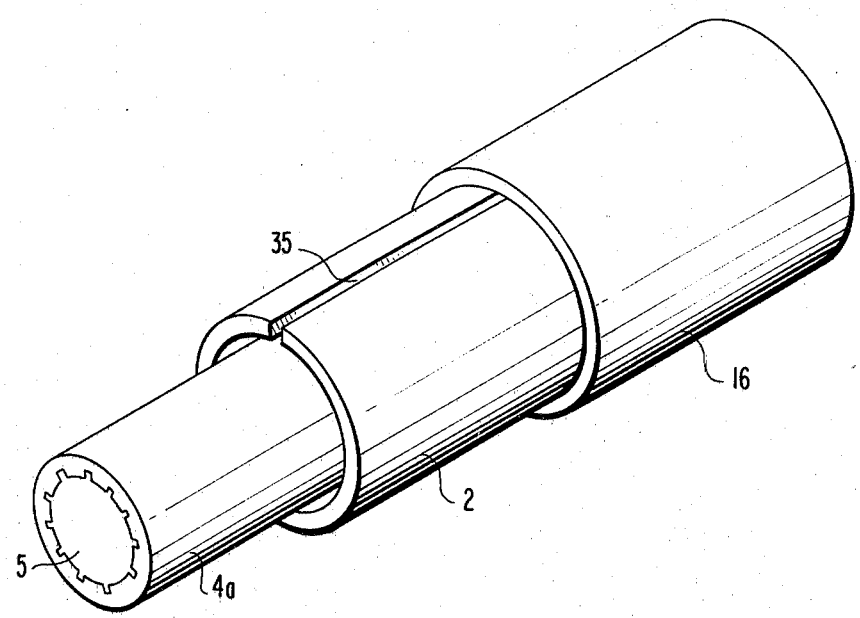
FIG. 8 is a view in perspective of the embodiment of the invention illustrated in FIG. 6.

Naturally, a coil spring or cylindrical spring can be put in use in place of the belleville springs 26 as illustrated in FIGS. 1 and 3. Also, it is possible to make the belleville spring 26 at the right end serve as the washer 25. FIGS. 6 and 8 show an alternate construction in which a ring 2 made of cylindrical spring steel and which has an axial slit 35 on a part of its circumference, presses against the inner surface of the casing cylindrical part 16, and the right end thereof contacts the clutch plate of the clutch disc 3.

At the beginning of the development, the applicant of this invention tried to arrange only a plurality of belleville springs having the same specifications back-to-back as shown in FIG. 6 in place of a plurality of belleville springs 26 and together with shims 27. However, in that arrangement is the event that weak belleville springs happened to be included there would be the possibility that only the weak belleville springs would bend back or buckle in the course of the clutch engaging stroke when the spring load increases. As a result there would be an insufficient retraction force and stroke.

In accordance with this invention, to prevent the buckling of the belleville springs 26, shims 27 are arranged between each of belleville springs 26, so that the buckling of any of the belleville springs can be prevented even when one or more of the springs are weak in relation to the other good quality springs. Thus the stable retraction force is obtainable and, at the same time, the required stroke can be ensured. Further, since buckling of one of the belleville springs can be avoided, the durability of the whole arrangement is improved.

When embodying the present invention, the belleville springs 26 may be arranged front and back alternately. However, it is preferable to arrange the belleville springs 26 in the same direction as illustrated in FIG. 3 because the shims 27 interposed between them also carry out the spring function to some extent and therefore can increase the effective stroke.

I claim:

1. A release assistor for a friction clutch, comprising:
   a rotatable flywheel;
   a main drive shaft having splines thereon;
   a pilot bearing for rotatably supporting said drive shaft in the center of said flywheel;
   a clutch disc adapted to rotate with said drive shaft;
   a pressure plate rotatable with said flywheel and adapted to press said clutch disc into frictional contact with said flywheel;
   an annular hub for connecting said clutch disc to said drive shaft, said hub operatively engaging said splines to cause said hub to rotate with said drive shaft and to permit said hub to move axially relative to said drive shaft, said hub including an annular shoulder on the end thereof nearest to said flywheel, and an integral portion adjacent said shoulder, having an outside diameter less than the diameter of the periphery of said shoulder;
   an annular casing overlying said integral portion and spaced therefrom, said casing being connected to supporting means associated with said drive shaft; a pawl member interposed between said casing and said integral portion adapted to contact said shoulder when the clutch is engaged and to be spaced from said the shoulder by a predetermined distance when the clutch is disengaged, said pawl member engaging the interior surface of said casing and being axially movable relative to said casing only in a direction towards said flywheel;
   biasing means engaging an end surface of said integral portion for causing said hub to move axially away from said flywheel, and adapted to contact said pawl member when said clutch is disengaged, said biasing means including a plurality of belleville springs and a shim interposed between each of said springs; and
   a spring supported on said drive shaft and engaging a surface of said hub to limit the axial movement of said hub during disengagement of the clutch, said spring applying a force to said hub which is less than the force applied by said biasing means.

2. The release assistor defined in claim 1, in which said supporting means comprises an inner race of the pilot bearing.

3. The release assistor defined in claim 1, in which the pawl member comprises a cylindrical body having an axial slit.

4. The release assistor defined in claim 1, in which the pawl member comprises an annular body having a plurality of claws on its periphery.

5. The release assistor defined in claim 4, in which ratchet teeth for preventing movement of the pawl member towards the spline hub are provided on an inner surface of the casing cylindrical part.

* * * * *